United States Patent [19]

Robichon

[11] Patent Number: 5,607,517
[45] Date of Patent: Mar. 4, 1997

[54] PROCESS FOR WASHING REFILLABLE PLASTIC BOTTLES

[75] Inventor: Patrice Robichon, Seine, France

[73] Assignee: Pernod Ricard, Paris, France

[21] Appl. No.: 218,354

[22] Filed: Mar. 28, 1994

[30] Foreign Application Priority Data

Nov. 22, 1993 [FR] France ................................ 93 13927

[51] Int. Cl.⁶ ........................................................ B08B 9/00
[52] U.S. Cl. ...................... 134/22.19; 134/22.17
[58] Field of Search ............................... 134/22.1, 22.17, 134/22.19

[56] References Cited

U.S. PATENT DOCUMENTS

| | | | |
|---|---|---|---|
| 4,680,060 | 7/1987 | Gupta et al. | 134/26 |
| 5,330,581 | 7/1994 | Syrinek | 134/22.17 |

FOREIGN PATENT DOCUMENTS

| | | |
|---|---|---|
| 0479393 | 4/1992 | European Pat. Off. . |
| 9117236 | 11/1991 | WIPO . |
| 9401268 | 1/1994 | WIPO . |

OTHER PUBLICATIONS

Derwent Publication AN: 93–367277 Apr. 11, 1993.
Derwent Publication AN: 84–011756 Jul. 21, 1993.
Derwent Publication AN: 93–208695 May 28, 1993.
Derwent Publication AN: 94–022552 Dec. 14, 1993.

*Primary Examiner*—John Sheehan
*Attorney, Agent, or Firm*—Foley & Lardner

[57] ABSTRACT

The present invention relates to a process for washing a container, especially a food or drink container, of the bottle type, and intended to be re-employed, especially for a use with foodstuffs, in which:

the reusable container is made of a homopolymer or a copolymer or a mixture of polymers, which is transparent and which has an average degree of crystallinity higher than 30%, the thickness of the walls of the container being greater than:

0.35 mm with regard to the body 1.00 mm at the base 1.00 mm at the bottom, and said container is washed with an aqueous solution at a temperature higher than 70° C.

18 Claims, No Drawings

PROCESS FOR WASHING REFILLABLE PLASTIC BOTTLES

The present invention relates to the field of refillable plastic bottles, especially for use with foodstuffs.

The plastic bottles employed especially for packaging carbonated beverages consist predominantly of polyethylene terephthalate (PET hereinafter).

Compared with other plastics (in particular PVC), PET exhibits excellent gloss and transparency properties and, compared with glass, it has the advantage of lightness and mechanical strength and this is why it is widely employed for large containers.

It has good mechanical properties and it offers good chemical resistances to oils, fats and the majority of organic solvents and solutions, to inorganic salt solutions and to hydrocarbons.

Thanks to biaxial stretching, the impact strength of PET is multiplied by 10 and its elasticity modulus by 4.

In addition, its impermeability to gases is remarkable, especially to carbon dioxide and to oxygen, which results in its very extensive use for carbonated beverages.

As a result of these properties, PET has become the reference packaging for large single-use containers.

However, there are many countries where refillable large containers occupy a predominant place, be it for legislative and ecological reasons (Northern Europe) or for economic reasons (South America). This is why new bottles appeared in Germany in 1990, which are refillable PET bottles. These bottles are a replacement for the returnable glass for the same reasons which made PET a success for single use, namely their strength and lightness.

The refillable bottles employed at present are made of PET by the conventional two-stage process.

This two-stage process separates the injection molding of a preform made of amorphous PET and the biaxial stretching of the preform to obtain the final container.

In the first stage the preforms are injection-molded on a press fitted with a drive and a multi-cavity mold. The preforms may be stored and transported to the point where the final bottle is blown.

In the second stage the amorphous PET preform is taken up, reheated to the optimum temperature and then biaxially stretched, mechanically by a metal plunger in the lengthwise direction and by high-pressure blowing in a transverse direction.

This process gives rise to two ranges of industrial machines:

injection presses for preforms up to 96 cavities and biaxial stretch blow molders up to 40,000 bottles/hour.

This process represents approximately 80% of the PET bottles manufactured worldwide, refillable or otherwise.

However, even after biaxial stretching, the PET bottles do not exhibit mechanical or even chemical properties (as will be seen later) which enable them to be re-employed.

To obtain a sufficient mechanical strength, the wall thickness must be increased and, in order to obtain refillable plastic bottles, this means doubling their weight.

The single-use bottles generally weigh of the order of 48 g in the case of a 1.5 l bottle, against approximately 100 g in the case of refillable bottles.

Furthermore, since these refillable bottles are manufactured by conventional technology, they must be washed at a temperature lower than 60° C.; above this temperature they shrink too much and may distort.

However, these conditions of washing at a temperature lower than 60° C. do not always make it possible to remove certain organic compounds which are bound by physical or chemical adsorption on the inner walls of the bottles, especially when the latter have been employed for storing non-foodstuff products.

This is why, on washing lines for these PET bottles, it is necessary to provide sniffers which sample each bottle to analyse for the possible presence of a certain number of contaminating agents, in order to reject the contaminated bottles.

The need for these very precise controls frequently results in the rejection of a large number of refillable bottles and thereby decreases the number of cycles of each bottle, this being in addition to the bottles rejected for mechanical defects, especially cracks, which, all in all, obviously appreciably reduces the profitability of the reuse process.

Thus, it was originally envisaged that refillable PET bottles were to withstand from 15 to 25 cycles, 15 cycles being the minimum objective, whereas in reality it is found that the average number of cycles undergone by a bottle is much lower than 15; 6–7 cycles are referred to in the case of some bottles, which is obviously very inadequate.

Various organizations have been concerned with the problem of refillable plastic bottles, this being in order to establish good codes of practice for companies employing refillable plastic bottles and in order to have better knowledge of the properties of these bottles when they are contaminated by foreign substances.

This is the case especially with the TNO (The Netherlands Organization for Nutrition and Food Research) and also with research which is conducted within the scope of the International Life Science Institute on this same type of product.

For the time being, the proposed solutions consist essentially in modifying the washing procedures so as to improve the decontamination, in employing more efficient sniffers and optionally in investigating new polymers or polymer blends which could make it possible to obtain refillable bottles that can be washed under better conditions.

The present invention is based on the finding of a property of certain aromatic polyesters which is that of resisting the binding of organic compounds which are possible contaminants of plastic bottles, the said property being additionally accompanied, in the case of these bottles, by a satisfactory resistance to drastic washing conditions.

The present invention is based on the use of a process making it possible to increase the resistance of aromatic polyesters, especially PET, to the binding of organic compounds, in which said polyester is treated to raise its crystallinity above 30% and preferably above 40%.

Processes already exist which make it possible to increase crystallinity by virtue of a relaxation of stresses by annealing, especially of PET above 30% and even above 40%; among these processes there may be mentioned especially the so-called SRF or SRCF process developed by the Sidel company and forming the subject especially of patent numbers EP 0,237,459, FR 2,649,035 and FR 2,658,119.

The annealing may be performed by different techniques, especially by the hot mold technique or by softening the biaxially stretched product.

The SRCF process is a particular method of implementation of the general process, in which to increase the crystallinity of aromatic polyesters the polyester in polymerized form is first of all biaxially drawn and then softened so as to release the stresses induced by the biaxial stretching and then, and only then, given the definitive shape.

The SRCF process, which is derived from the two-stage process, starts with a preform manufactured on an independent press. The continuation of the process comprises 4 stages:

1) the body of the preform is heated,
2) a first oversized bottle is biaxially stretch-blow molded,
3) this bottle is passed through an infrared oven called "recovery oven"; two things happen: on the one hand the neck is crystallized and becomes white; on the other hand, under the effect of the temperature, 200° C. for approximately 1 minute 30, the body of the bottle contracts: the stresses induced during the biaxial stretching stages have been released, the bottle then takes on a "potato-like" shape; the density of the PET of which the body of the article is composed has greatly increased, the PET is thereafter crystallized and has become heat-resistant,
4) the article is then finished by a second blowing with biaxial orientation, the bottle then taking on its definitive shape.

The previous SRF process did not include heating in an infrared oven; the ring was crystallized before the reheating of the preform.

This process has already been employed so as to improve the heat resistance of single-use bottles, this being in order to permit hot filling with a still product or pasteurization of a carbonated product after filling the bottle.

No mention has ever been made of the fact that this process increased the resistance of the polymer to the binding of organic products by physical or chemical adsorption, especially of contaminating products that can be found in refillable bottles which have been employed for storing household products, chemicals or other products.

This is why the present invention also relates to a process for washing a container, especially a food or drink container, of the bottle type and intended to be reused, especially for a use with foodstuffs, in which:

the reusable container is made of a homopolymer or a copolymer or a mixture of polymers, which is transparent and which has an average degree of crystallinity higher than 30%, the thickness of the walls of the container being greater than:
0.35 mm with regard to the body
1.00 mm at the base
1.00 mm at the bottom, and
said container is washed with an aqueous solution at a temperature higher than 70° C.

The plastic containers employed in this process have the characteristic of being capable of being washed under conditions close to the conditions employed for returnable glass bottles, and the said containers, being thicker than the non-reusable bottles, exhibit mechanical characteristics which ensure their refilling under good conditions.

In particular, this type of container can be washed with an aqueous solution containing a base, especially a hydroxide at concentrations which can vary from 1 to 3% in the presence of a wetting agent, this washing being optionally carried out at temperatures higher than 80° C. and possibly reaching 85° C., temperatures and conditions that are usually employed for reusable glass containers.

The container is preferably made of a polymer or a copolymer of polyester type, or a mixture of such polymers, involving in particular linear polyesters resulting from the condensation of an aromatic diacid and a diol.

Among the polymers which can be employed there should be mentioned the polymers obtained with:
terephthalic acid
naphthalic acid
dimethyl terephthalate
isophthalic acid
dimethyl isophthalate by condensation with diols such as:
ethylene glycol
1,4-cyclohexanedimethanol.

Among the different possible polymers or copolymers, there must be mentioned, very particularly, PET and the polyethylene glycol naphthalate copolymer (PEN hereinafter), as well as mixtures of these two copolymers (PET+PEN blends).

In this process, it will be preferred to employ bottles with relatively thick walls while keeping the weight advantages linked with the use of plastic bottles; in particular, the container walls will be able to have thicknesses greater than:
0.4 mm with regard to the body (or even greater than 0.5 mm)
1.25 mm at the base (or even greater than 1.7 mm)
1.90 mm at the bottom (or even greater than 2.5 mm)

In order to ensure an equal distribution of the stresses induced by the hot washing, it will be preferred to employ containers which have substantially equal wall thicknesses at both the body and the base, and to employ, for example, a container which has a substantially hemispherical bottom, by then making use of a known technique of adhesively bonded basecup to enable the bottle to stay upright.

Nevertheless, it is possible to envisage self-stable or petaloid bottoms.

The present invention preferably relates to containers comprising a label that can be unstuck under the washing conditions, this being so as to enable the container to be washed inside and outside all at the same time in the washing solution.

The container according to the present invention is preferably obtained by making use of one of the processes described above.

The present invention also relates to the containers intended to be washed by the process described above.

Other characteristics and advantages of the present invention will appear on reading the example below.

EXAMPLE

Two types of bottles were tested, exhibiting crystallinity percentages lower than 10% and higher than 40%.

Bottles of the first type are obtained by conventional techniques in two stages with control of the crystallinity. Bottles which have a degree of crystallinity higher than 40% are obtained by the SRCF process referred to above.

The contaminants employed are:
methyl parathion diluted to 0.4 g/l, (this compound being that presenting the main problem of decontamination according to the TNO analyses) and
lead-free 98 premium gasoline, undiluted, (this compound being the contaminant most frequently stored in refillable bottles).

The contaminant is stored in the bottle for 48 hours before the washing.

The washing solution employed is a solution of sodium hydroxide (NaOH) at a concentration of 1.5% with a liquid P3 Stabilon detergent at a concentration of 0.3%.

The following are performed:
a pre-rinsing by injecting hot water (45°±5° C.) for 2 minutes,
then a washing at 60° or 80° C. with the washing solution for 10 minutes, finally, rinsing by injecting hot water (45°±5° C.) for 2 minutes and injecting cold water for 2 minutes.

The results observed are as follows:

TABLE 1

Degree of residual contamination by parathion-methyl in μg/bott as a function of the washing temperature

| Percentage of crystallization of the bottle | After washing at 60° C. Cumulative total in the material and the simulant product | After washing at 80° C. Cumulative total in the material and the simulant product |
|---|---|---|
| ≧40% | 1.4 | ND |
| ≦10% | 2.5 | — |

ND = Not Detected

TABLE 2

Degree of residual contamination by gasoline in mg/bott as a function of the washing temperature

| Percentage of crystallization of the bottle | After washing at 60° C. Cumulative total in the material and the simulant product | After washing at 80° C. Cumulative total in the material and the simulant product |
|---|---|---|
| ≧40% | 4.60 | 0.39 |
| ≦10% | 6.42 | — |

It is found in Table 1 that at 60° C. the bottles according to the invention exhibit nearly 50% less of contaminants when compared with the traditional reusable bottles.

In Table 2 a decrease of 30% in the contamination is similarly found in the case of the bottles according to the invention when compared with traditional reusable bottles washed at 60° C.

However, of course, the temperature-resistant bottles according to the invention can be washed at 80° C., which is not the case with traditional bottles. In this case, the residual contamination (after washing at 80° C.) is reduced by 91% when compared with washing at 60° C. and by 94% when compared with traditional bottles (Table 2).

In Table 1 the residual contamination of the bottles according to the invention (washed at 80° C.) is below the threshold of detection.

What is claimed is:

1. A process for washing a used container containing organic contaminating agents, said container intended to be reused and having a body, a bottom on which the container rests and a base portion extending from the body to the bottom, wherein the reusable container is made of a homopolymer or a copolymer or a mixture of a homopolymer and a copolymer, wherein said homopolymer or said copolymer or said mixture of a homopolymer and a copolymer is selected from the groups consisting of aromatic polyesters, further wherein said container is transparent and has an average degree of crystallinity higher than 40%, the thickness of the container being greater than:

0.35 mm with regard to the body, 1.00 mm as the base portion, 1.00 mm at the bottom, said process comprising washing for re-use said container with an aqueous solution containing a base at a temperature higher than 70° C.

2. The process as claimed in claim 1, wherein the aqueous solution contains a base and a wetting agent.

3. The process as claimed in claim 2, wherein the aqueous solution is a solution with at least 1% by weight of hydroxide.

4. The process as claimed in one of claims 1 to 3, wherein the temperature is higher than 80° C.

5. The process as claimed in claim 1, wherein said homopolymer or said copolymer or said mixture of a homopolymer and a copolymer is a polyester.

6. The process as claimed in claim 5, wherein said homopolymer or said copolymer or said mixture of a homopolymer and a copolymer is selected from the group consisting of an aromatic diacid and a diol.

7. The process as claimed in claim 6, wherein said homopolymer or said copolymer or said mixture of a homopolymer and a copolymer is selected from the group consisting of terephthalic acid, napthalic acid, ethylene glylcol and derivatives thereof.

8. The process according to claim 7, wherein said container is formed of a copolymer or a polyethylene glycol terephthalate (PET) copolymer or polyethylene glycol naphthalate (PEN) copolymer or a mixture of a PET and PEN.

9. The process as claimed in claim 7, wherein the thickness of the walls of the container is greater than:

0.4 mm with regard to the body 1.25 mm at the base portion, and 1.90 mm at the bottom.

10. The process as claimed in claim 1, wherein the container has a substantially hemispherical, self-stable or petaloid bottom.

11. The process as claimed in claim 1, wherein the container includes a label removable during the washing step.

12. The process as claimed in claim 1, wherein the container is obtained from a preform by at least one biaxial stretching stage and then, after an annealing to release the stresses induced, given the final shape with a degree of crystallinity higher than 30%.

13. The process as claimed in claim 12, wherein the annealing is obtained by the hot mold technique.

14. The process as claimed in claim 12, wherein the annealing is obtained by softening the biaxially drawn product.

15. The process as claimed in claim 1, wherein the thickness of the container is substantially uniform over the body and the base portion.

16. The process as claimed in claim 1 wherein said container is a food or drink container.

17. The process as claimed in claim 1 wherein said container is a bottle.

18. The process as claimed in claim 1 wherein said container is for use with foodstuffs.

* * * * *

UNITED STATES PATENT AND TRADEMARK OFFICE
CERTIFICATE OF CORRECTION

PATENT NO.　：　5,607,517
DATED　　　：　March 4, 1997
INVENTOR(S)：　Robichon

It is certified that error appears in the above-identified patent and that said Letters Patent is hereby corrected as shown below:

Please note that Column 6, line 45, Claim 12, contains a typographical error wherein "30%" should read --40%--.

Signed and Sealed this

Seventeenth Day of February, 1998

*Attest:*

BRUCE LEHMAN

*Attesting Officer*　　　*Commissioner of Patents and Trademarks*